United States Patent
Ressler

(10) Patent No.: US 11,313,407 B2
(45) Date of Patent: Apr. 26, 2022

(54) TENSIONING TOOL

(71) Applicant: Dutch Clips LLC, Lancaster, PA (US)

(72) Inventor: Thomas Ressler, Reinholds, PA (US)

(73) Assignee: Dutch Clips LLC, Lancaster, PA (US)

(*) Notice: Subject to any disclaimer, the term of this patent is extended or adjusted under 35 U.S.C. 154(b) by 0 days.

(21) Appl. No.: 17/156,033

(22) Filed: Jan. 22, 2021

(65) Prior Publication Data
US 2021/0140468 A1 May 13, 2021

Related U.S. Application Data

(63) Continuation of application No. 15/061,164, filed on Mar. 4, 2016, now Pat. No. 10,927,882.

(51) Int. Cl.
*F16B 45/00* (2006.01)

(52) U.S. Cl.
CPC .................. *F16B 45/00* (2013.01)

(58) Field of Classification Search
CPC ....... F16B 45/00; E04H 15/64; Y10T 24/3916
See application file for complete search history.

(56) References Cited

U.S. PATENT DOCUMENTS

| | | | | |
|---|---|---|---|---|
| 1,565,041 A | * | 12/1925 | Arney | F16G 11/046 24/129 R |
| 1,583,343 A | * | 5/1926 | Duerden | F16G 11/14 24/129 R |
| 1,713,106 A | * | 5/1929 | Ulfers | F16G 11/14 24/129 R |
| 2,538,021 A | * | 1/1951 | Lushbaugh | E04H 15/322 135/120.2 |
| 5,625,925 A | | 5/1997 | Richards | |
| 7,383,597 B2 | | 6/2008 | Steiner | |
| 7,856,699 B2 | | 12/2010 | Sorensen et al. | |
| D745,377 S | | 12/2015 | Ressler et al. | |
| 9,528,655 B1 | | 12/2016 | Miles | |
| 9,694,877 B2 | | 7/2017 | Miles | |
| 10,099,071 B2 | * | 10/2018 | Pettey | A62B 1/14 |
| 10,820,584 B2 | * | 11/2020 | Petersen | A01M 1/10 |
| 11,064,770 B2 | * | 7/2021 | Ressler | A44B 11/18 |
| 2005/0061905 A1 | * | 3/2005 | Sherman | F16G 11/14 242/388.2 |
| 2005/0161653 A1 | | 7/2005 | Greer, Jr. et al. | |
| 2006/0000069 A1 | * | 1/2006 | Mair | F16B 45/00 24/598.7 |
| 2008/0110000 A1 | | 5/2008 | Orr | |
| 2010/0024177 A1 | * | 2/2010 | Hayes | F16B 45/00 24/588.1 |
| 2012/0297582 A1 | * | 11/2012 | Lee | A63B 21/0557 24/265 H |
| 2014/0166798 A1 | | 6/2014 | Davison | |
| 2014/0196209 A1 | | 7/2014 | Macaskill | |
| 2015/0176678 A1 | * | 6/2015 | Burrell | F16G 11/14 24/129 R |
| 2017/0020235 A1 | * | 1/2017 | Beitzel | F16G 11/103 |

* cited by examiner

*Primary Examiner* — Robert Sandy
*Assistant Examiner* — Louis A Mercado
(74) *Attorney, Agent, or Firm* — Barley Snyder

(57) ABSTRACT

The tensioning tool provides a monolithic tool particularly well suited to use with securing tarp systems used in outdoor recreation, and also useful in other applications and in other fields to anchor or secure weights or loads.

14 Claims, 7 Drawing Sheets

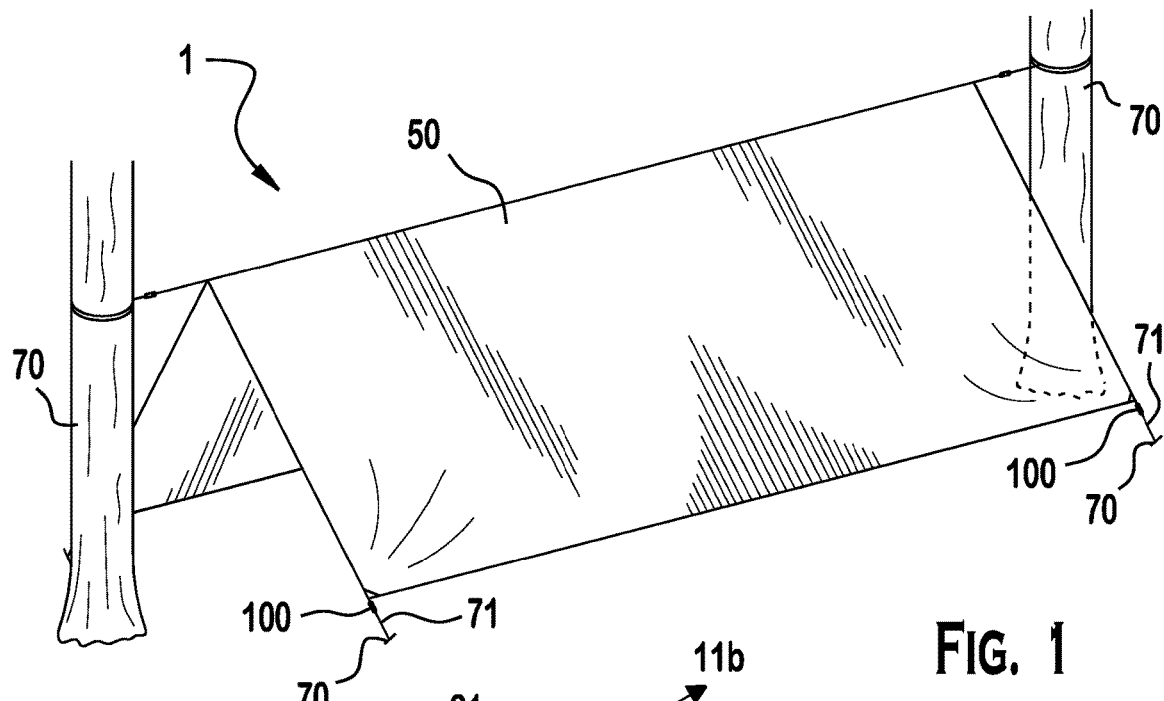
FIG. 1
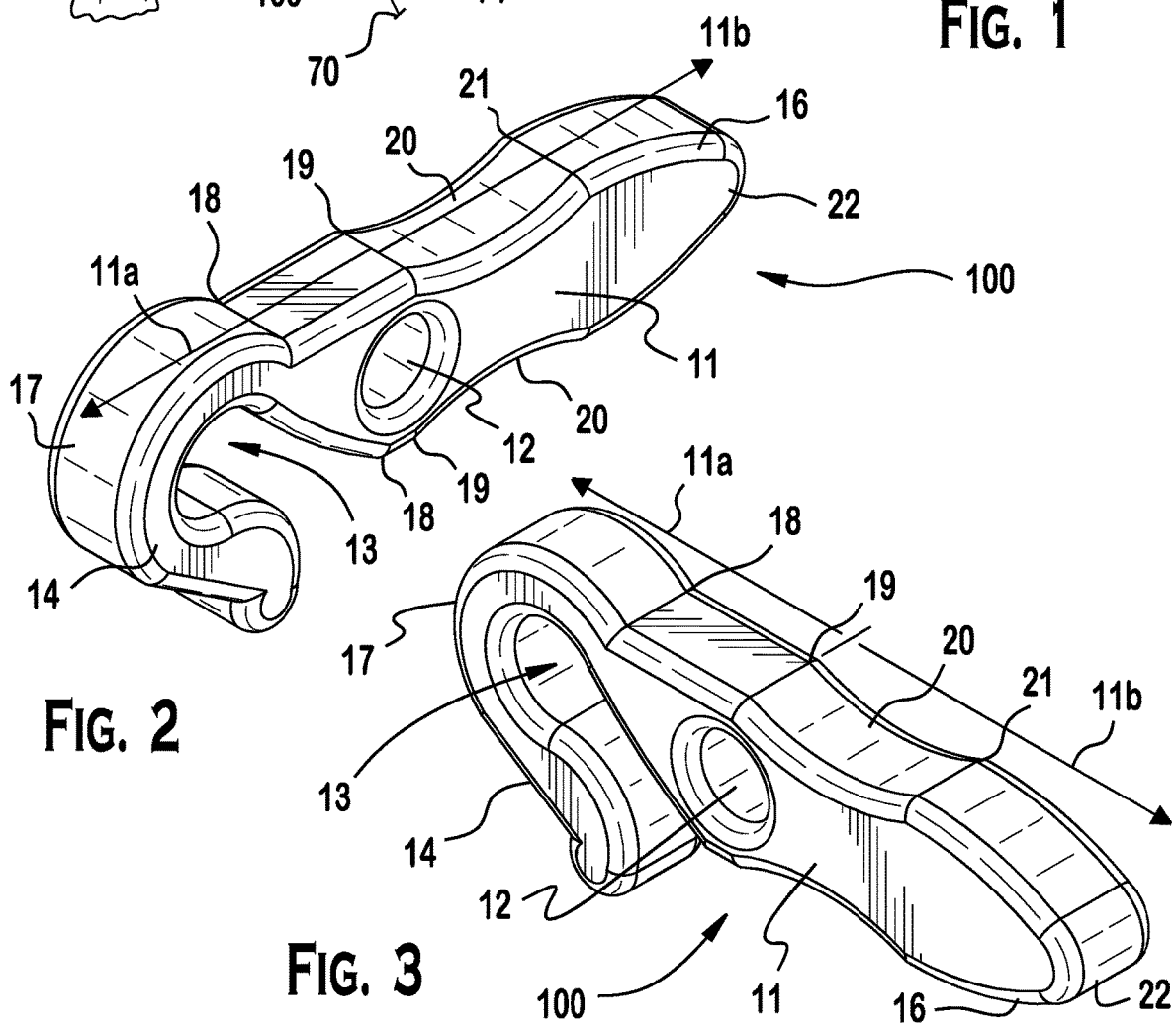
FIG. 2
FIG. 3

TENSIONING TOOL

CROSS-REFERENCE TO RELATED APPLICATIONS

This application claims the benefit of the filing date under 35 U.S.C. § 119(a)-(d) of U.S. Provisional application Ser. No. 15/061,164, filed Mar. 4, 2016.

FIELD OF THE INVENTION

The invention relates to a tensioning tool and, more particularly, to a tensioning tool for cordage or webbing connecting two points.

BACKGROUND

Tools for securing cordage or webbing between two objects or points of attachment are of interest in many applications. In particular, there is a need for a tool to quickly set, maintain, or adjust tension in cordage or webbing used for camping equipment, such as tents, tarpaulins (tarps), hammocks, flys, and similar shelters or other structures.

While tools to set, maintain, and adjust tension in cordage or webbing are known, these known tools are generally bulky, weighty, and cumbersome, and often include various hooks, eyes, cleats, grips, pulleys, and the like, which require multiple knots to function.

SUMMARY

In light of the shortcomings of the prior art and to solve a long felt need, a tensioning tool is provided. The tensioning tool comprises a body having a proximal portion and a distal portion positioned opposite the proximal portion and having a waist defined by a pair of shoulder projections and a pair of hip projections positioned on opposite sides of the waist; a proximal passageway extending through the body from lateral sides thereof and positioned proximate the proximal portion; and a distal passageway extending through the body from lateral sides and positioned between the waist and the proximal passageway. A kit comprising a plurality of tensioning tools and a plurality of tie materials sized to be used with the tensioning tool as described herein is provided. A tensioning system is provided which uses a plurality of tensioning tools and a plurality of tie materials to anchor or secure a load.

BRIEF DESCRIPTION OF THE DRAWINGS

The invention will now be described by way of example with reference to the accompanying figures of which:

FIG. 1 is a perspective view of a cordage tension system using a tensioning tool system according to the invention;

FIG. 2 is a perspective view of a tensioning tool according to the invention;

FIG. 3 is another perspective view of the tensioning tool of FIG. 2;

DETAILED DESCRIPTION OF THE EMBODIMENT(S)

Figure 4:
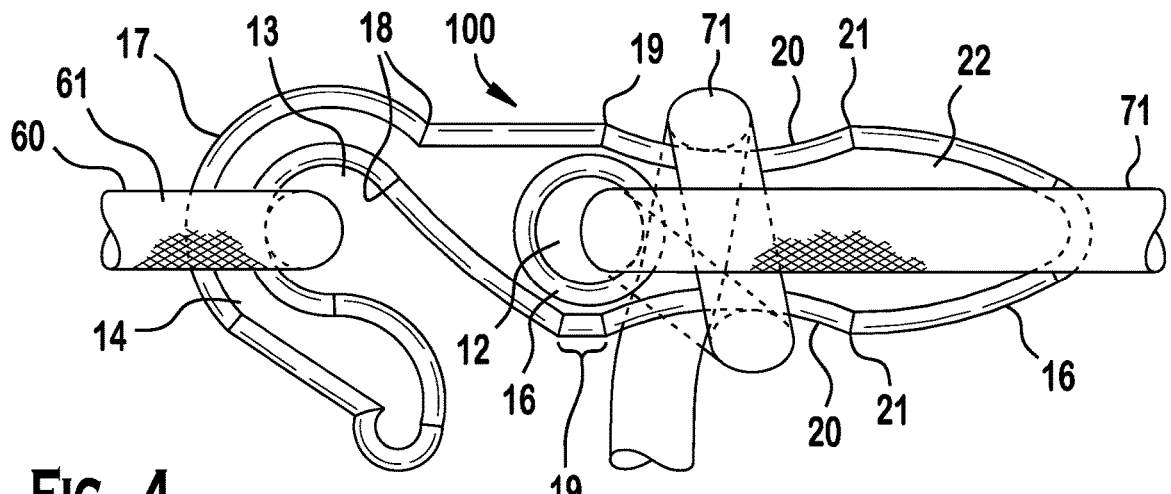
FIG. 4 is a right side elevation view of a tensioning tool according to the invention in a locked configuration.

Embodiments of the invention will now be described in greater detail with reference to the drawings.

Referring first to FIGS. 1 and 2, a tensioning tool 100 for a tensioning tool system 1 is shown. Additional variation of tensioning tool 100 are also provided as tensioning tool 200 and tensioning tool 300 as described more particularly below. For ease of reference, tensioning tool 100 will be referred to when common structure and function is described.

As shown in FIGS. 2 through 18, the tensioning tool 100 generally includes a body 11 having a proximal portion 11a and a distal portion 11b. The proximal portion 11a is positioned along one half of the body 11, while the distal portion 11b is positioned on the opposite half of the body 11.

In the shown embodiment of FIGS. 2 through 8, the body 11 is generally hour glass shaped. The body 11 includes a head 17 along a proximal end of the proximal portion 11a and a tail 22 positioned along a distal end of the distal portion 11b, opposite the head 17. The body 11 further includes a distal passageway 12 and a proximal passageway 13. The distal passageway 12 is positioned centrally along the length of body 11 and between upper and lower shoulders 19 as described below. The proximal passageway 13 in the shown embodiments is positioned within head 17 portion, as described below. As shown in FIGS. 1, 4-8, 10-13, and 16-18, tie materials 60 are threaded through the distal passageway 12 or the proximal passageway 13 respectively to secure the load as described in greater detail below.

Figure 5:
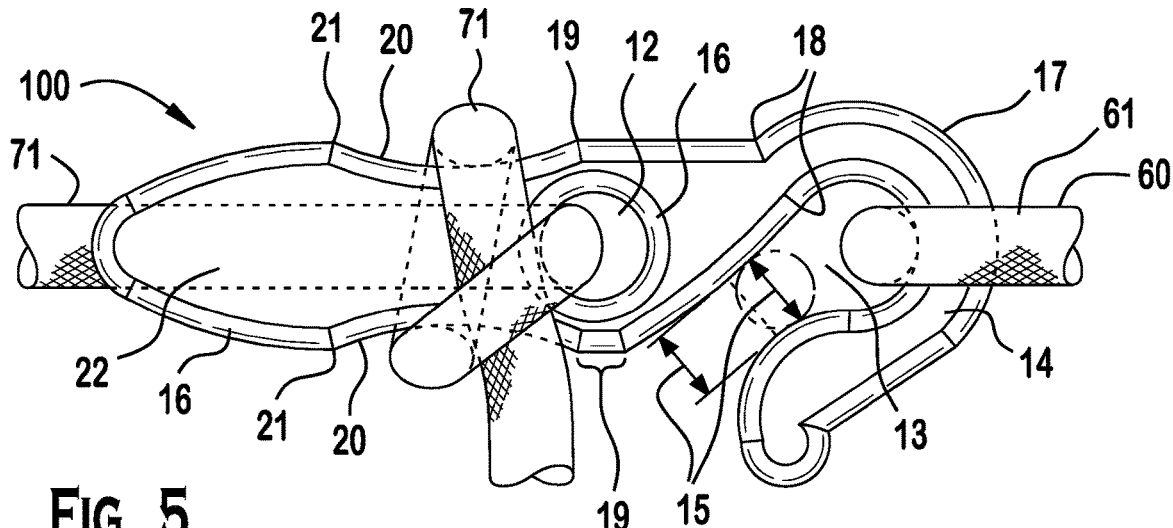
FIG. 5 is a left side elevation view of the tensioning tool of FIG. 4.

Referring to FIGS. 2 through 8, the tensioning tool 100 is shown, in which the head 17 is shaped to form a hook 14. The hook 14 opens up and leads into the proximal passageway 13, such as to receive a tie material 60 which may more particularly be a shock cord 63 or a D-ring 65 used to couple the tensioning tool 100 to the tarp 50 or other load. In the shown embodiment, the proximal passageway 13 has a diameter greater than the diameter of tie material 60. As shown in FIG. 5, the distal opening 15 in the hook 14 is sized to be generally smaller than the diameter of the proximal passageway 13. The distal opening 15 in the hook 14 also is sized to allow the passage of the diameter of the tie material 60 chosen for a particular application, particularly in the case that the tie material 60 forms a continuous loop that would not permit a first end of the tie material 60 from being threaded through the proximal passageway 13.

The hook 14 of tensioning tool 100 is shaped at distal opening 15 to admit the passage of various tie materials 60 into proximal passageway 13. In one embodiment the tie material 60 is a D-ring 65, the D-ring made of metal, metal alloy, plastic, or other suitable material known to one of skill in the art. In another embodiment the tie material 60 is cordage, is not rigid, and is elastic with a diameter not larger than that of proximal passageway 13 and preferably larger than the length of distal passageway 12. The diameter of proximal passageway 13 interacts with the smaller length of the distal opening 15 to allow tie material 60 to be received in the proximal passageway 13 of the hook 14 while the relatively smaller distal opening 15 generally restrains the tie material 60 from slipping out of the hook 14 if the tension on tie material 60 is eased. This restraining effect is more pronounced where the tie material 60 has a diameter relatively larger than the length of distal opening 15.

As shown, the body 11 further generally includes pairs of features that are identified as necks 18, shoulders 19, waists 20, and hips 21. Necks 18 are located in the proximal portion 11a between the head 17 and the shoulders 19. In the embodiment of tensioning tool 100, the necks 18 are generally distal to proximal passageway 13 and proximal to distal passageway 12. Necks 18 are positioned on both a top and a bottom surface of the body 11.

As shown in FIGS. 2 through 18, the waist 20 is defined by a pair of shoulders 19 and a pair of hips 21 which outwardly project from a longitudinal axis of the body 11 and which are positioned symmetrically on both a top and a bottom surface of the body 11 in the exemplary embodiment. The shoulders 19 and the hips 21 are positioned respectively proximally and distally relative to waists 20, a portion of the body 11 that, in top to bottom cross-section of the body 11, is of shorter diameter than the cross sections of the body 11 between shoulders 19 or hips 21.

In the shown embodiment, the tensioning tool 100 is made from a rigid material, such as titanium, aluminum, or steel. In the shown embodiments, the body 11 is a solid monolithic piece of material. However, one skilled in the art would appreciate that the body 11 may be prepared from other structural materials including an alloy of metals, a polymer, a composite, or other suitable material known to the art. The choice of the rigid material is influenced by the material's weight, durability, and cost. Further, one skilled in the art would appreciate that the body 11 may be hollow.

The body 11 is manufactured through machining, but could be manufactured using casting, stamping, or other method known to one of skill in the art and consistent with the chosen material to achieve a desired strength for its intended use. For instance, a body 11 made of a polymer could be manufactured using injection molding.

In the embodiments shown, the edges 16 are manufactured to be beveled or softened from a 90° angle along a perimeter thereof and, more particularly, along the waist 20 and at the distal passageway 12 and proximal passageway 13 in order to avoid wear on the support line 61 or anchor line 71 passing over the beveled edge 16.

It is expected that the tensioning tool 100 may be scaled larger or smaller to accept tie material 60 of different diameters or width for use in different applications. The use of such relatively larger or smaller tensioning tools 100 will be the same regardless of the specific application.

Referring back to FIG. 1, use of the tensioning tool system 1 will be described. The tensioning tool 100 is generally used to maintain tension in tie materials 60 that restrain a tarp 50 or other load (i.e., tent, hammock, food container, etc.).

As shown in FIG. 1, the tarp 50 is positioned between anchors 70 or supports using tie materials 60 and one or more tensioning tools 100. A support or anchor 70 may be vertical to the ground, such as a tree, post, or similar stationary element. Alternatively, a support or anchor 70 may be horizontal, such as a ground site or a platform and hardware therein. The tarp 50 is made from a variety of materials, such as plastic, fabric, paper, or other materials suitable to the requirements of a particular use. One skilled in the art would appreciate that the shape, size, and texture of the tarp 50 can be modified and designed for a particular use.

The tie materials 60 are selected to pass through the respective distal and proximal passageways 12, 13 in the body 11 and to possess characteristics of strength and durability suitable for the tension and weight to be secured with them. Choices of material suitable to a particular application are a flexible, linear element such as a cord, cable, line, rope, string, or twine (hereinafter referred to generally as "line") or a strap, webbing, or ribbon (hereinafter referred to generally as "strap"). The support line 61 and anchor line 71 have a substantially circular cross-section and a diameter selected to be suitable for the weight to be secured and the material from which the support line 61 and anchor line 71 are made. The strap 62 has a substantially rectangular cross-section; its width is substantially greater than its height and its overall dimensions are suitable for the weight to be secured and the material from which the strap 62 is made. With regard to the support line 61, shock cord 63, the anchor line 71, and the strap 62, the dimensions of the tie materials 60 are sized relative to the dimensions of the tensioning tool 100.

The support line 61, strap 62, shock cord 63, or anchor line 71, are made of various materials including braided or twisted nylon or other plastic polymer, natural fibers, such as hemp or silk, and other such material used by those of skill in the art to secure weights or loads. Preferably, the line selected to use with the tensioning tool is an ultra-high molecular weight polyethylene (UHMwPE) fiber. This type of fiber is alternatively referred to as high-modulus polyethylene (HMPE) and high-performance polyethylene (HPPE). This type of fiber features light weight, high strength, high durability, and a surface texture conducive to maintaining a knot structure suitable for securing tent lines. One commercially available fiber suitable for use with the tensioning tool 100 is Dyneema®. However, such a high performance line is not required as the tensioning tool 100 may be used with any material that is appropriate for the weight to be secured and particular embodiment of the invention. An alternative choice of fiber for tie materials 60 are a lightweight nylon kernmantle rope, also referred to as parachute cord. A further alternative choice of fiber can be a monofilament line. The tie materials 60 are sized to meet the use and dimensions of the tensioner tool 100. In an exemplary embodiment, the tensioning tool 100 is sized for 3/32" to 1/8" static (non-stretch) cordage, but is not limited for use with any specific sized tie material. In applications of the tensioning tool 100, a user should not attempt to secure a load heavier than what the chosen tie material 60 can support.

In use in a method for anchoring or securing a load or a weight, the proximal portion 11a of the tensioning tool 100 connects support line 61 directly or indirectly to the tarp 50 or load to be secured. In use, the distal portion 11b of the tensioning tool 100 is used to connect an anchor line 71 to an anchor 70 to secure the weight and position of the load to be secured. When using tensioning tool 100, it is desirable to maintain tension of the support line 61, strap 62, or shock cord 63, and anchor line 71 in a substantially linear orientation relative to a longitudinal axis of tensioning tool 100.

In order to provide tension, as shown in FIGS. 4 through 8, in an exemplary embodiment, a tarp 50 or other load is connected to the hook 14 directly or indirectly by means of a first tie material 60, in particular a support line 61, shock cord 63, a strap 62, or a D-ring 65 at a tarp securing point 51 on a tarp 50.

The support line 61, shock cord 63, strap 62, or D-ring 65 is retained in the proximal passageway 13. It is also contemplated that other intermediate (indirect) coupling means or methods between the tarp 50 or other load and the tensioning tool 100 may be used within the spirit of the invention.

A first end of an anchor line 71 is secured to an anchor 70; a second end of the anchor line 71 is passed through the distal passageway 12. Force is applied to shorten the length of the anchor line 71 between the anchor 70 and the distal passageway 12 to create a desirable tension that will maintain the tarp 50 or other load in position.

Figure 6:
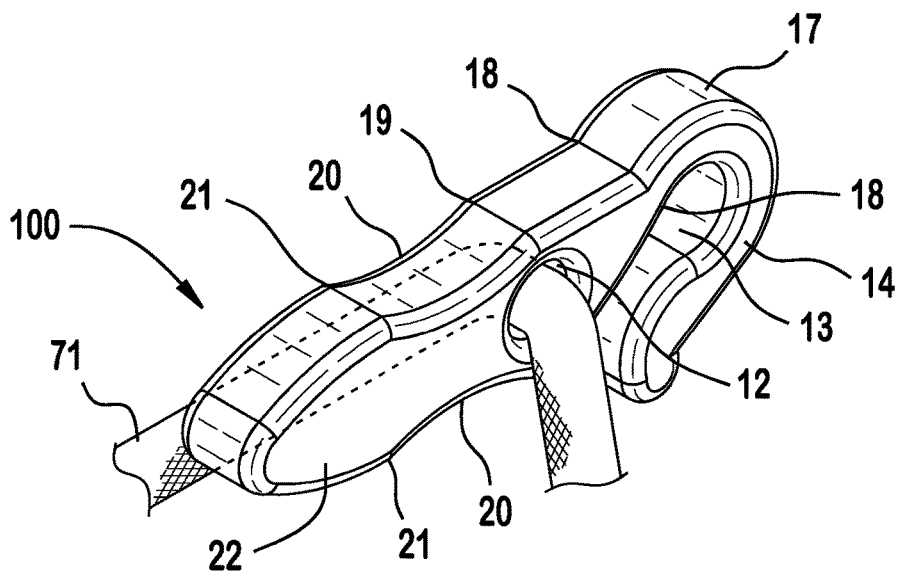
FIG. 6 is a perspective view of a tensioning tool according to the invention, showing a first position of cordage extending through the tensioning tool.
Figure 7:
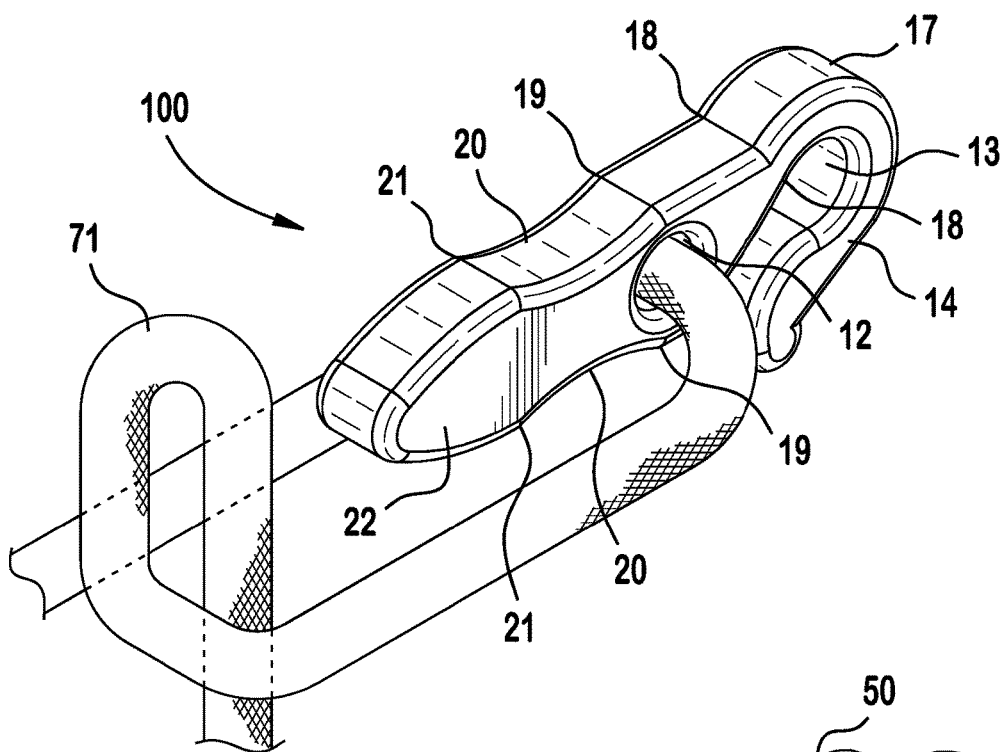
FIG. 7 is a perspective view of the tensioning tool of FIG. 6, showing a second position of the cordage with respect to the tensioning tool.
Figure 8:
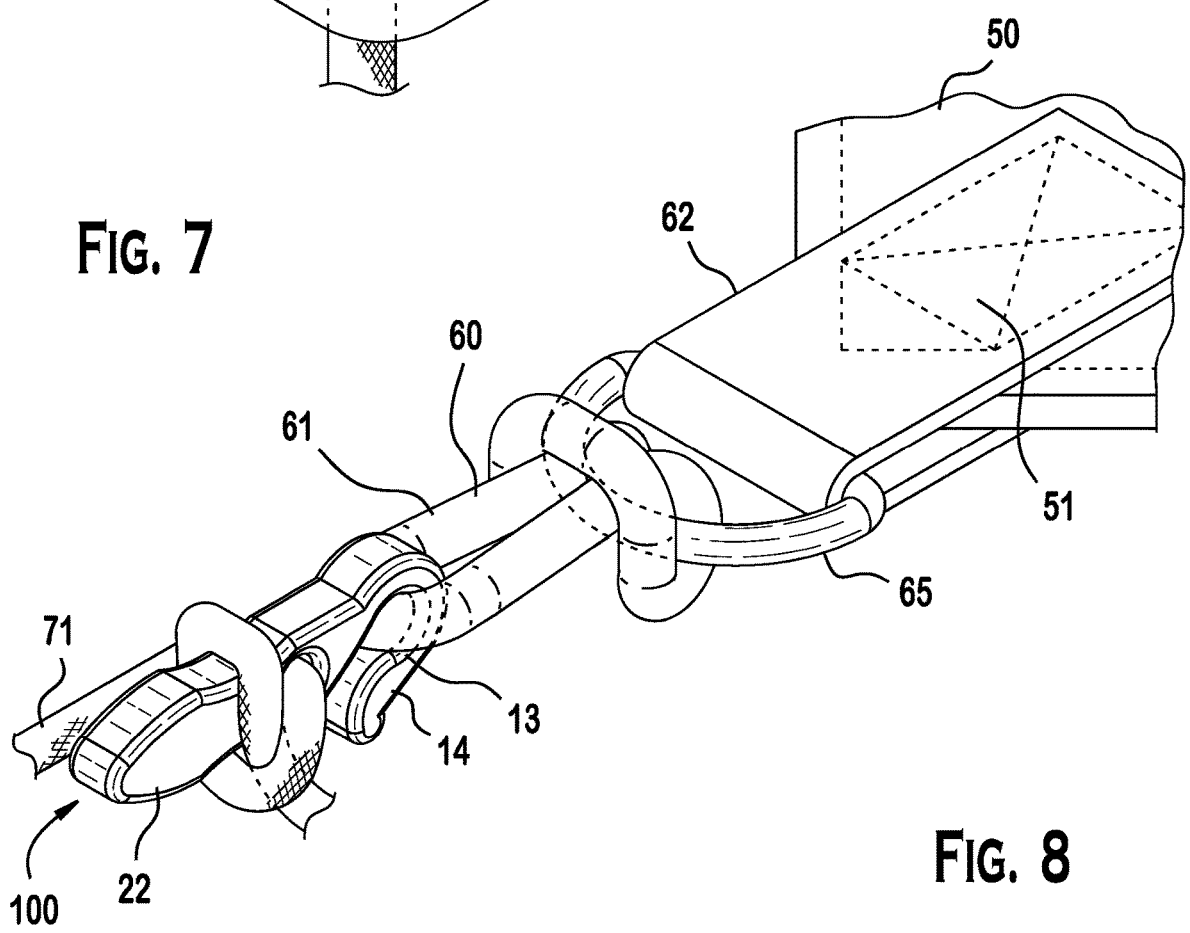
FIG. 8 is a perspective view of the tensioning tool of FIG. 6, showing a third position of the cordage in a locked configuration with the tensioning tool.
Figure 9:
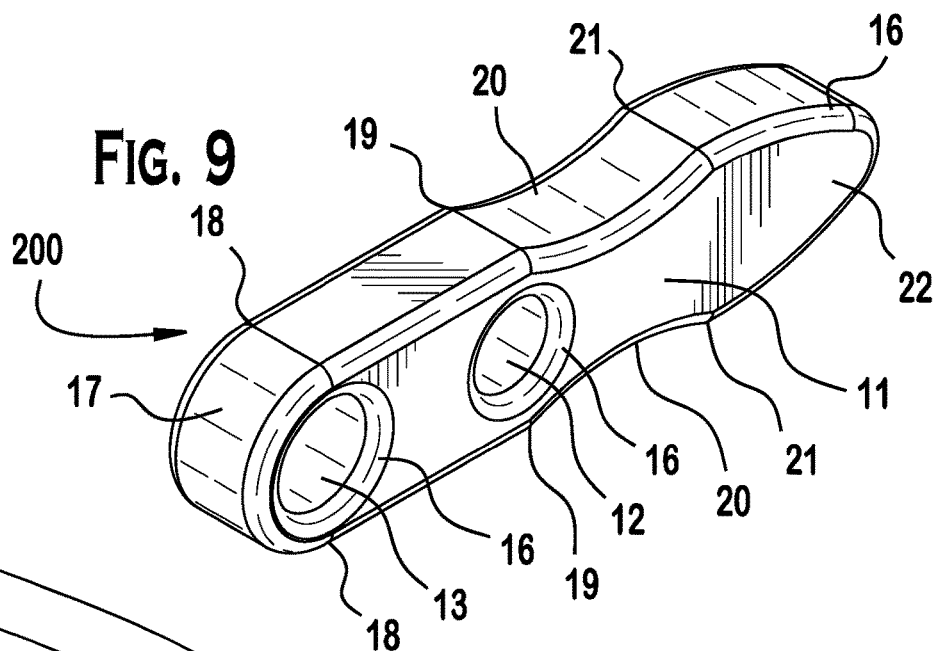
FIG. 9 is a perspective view of another tensioning tool according to the invention.

Referring to a sequence shown in FIGS. 6 through 8, once a desired tension in the anchor line 71 is achieved, the anchor line 71 is looped about the body 11 at the waist 20, so as to use the tension in the anchor line 71 and the shape of the body 11 to secure the anchor line 71 and maintain the desired tension. More particularly, the looped anchor line 71 traps and holds in place the weighted structure secured with the hook 14. The tension caused by the load prevents the anchor line 71 from slipping from the desired position at the waist 20 of the body 11. Preferably, the anchor line 71 is looped in such a way that the weight of the item to be secured traps and holds a portion of the anchor line 71 at a desired tension until deliberately released.

FIGS. 4 and 5 show the left and right sides of the body 11 with the anchor line 71 and tie material 60 in position. FIGS. 6, 7, and 8 show a sequence of how anchor line 71 is looped and held to secure the tarp 50 or load. FIG. 8 shows the anchor line 71 threaded through the distal passageway 12 and the hook 14 coupled to cordage connected to a D-ring 65 at the end of a tarp securing point 51 on a tarp 50.

More particularly, referring to FIG. 7, in an exemplary embodiment, a portion of the second end of the anchor line 71 that was threaded through the distal passageway 12 is formed into a loop 72 and then positioned between the body 11 and the length of the anchor line 71 that extends along one side of the body 11 before it is threaded through the distal passageway 12. In this configuration, the tension securing the tarp 50 or load is released when the second end of the anchor line 71 is pulled free of the portion of anchor line 71 that held it against the body 11 of the tensioning tool 100. This release action may be performed one handedly as it advantageously does not rely on a knotting of the anchor line 71.

The second end of the anchor line 71 may alternatively be passed through a loop that is formed between the distal passageway 12 and the first end of the anchor line 71. As a result, a knot is provided and tightened about the shoulders 19 between the waist 20 and the hips 21. This knotted configuration with the tensioning tool secures the tarp 50 or other load, though a one handed release is thus prevented.

The disclosed configuration keeps the anchor line 71 removably secured in place about the waist 20 and the outward projections of the shoulders 19 and the hips 21 prevent movement of the anchor line 71 while it is under tension.

As shown in FIGS. 9 through 13, another tensioning tool 200 according to the invention is shown. For the sake of brevity, only those features that differ from the tensioning tool 100 will be described, while like components will be omitted.

Figure 10:
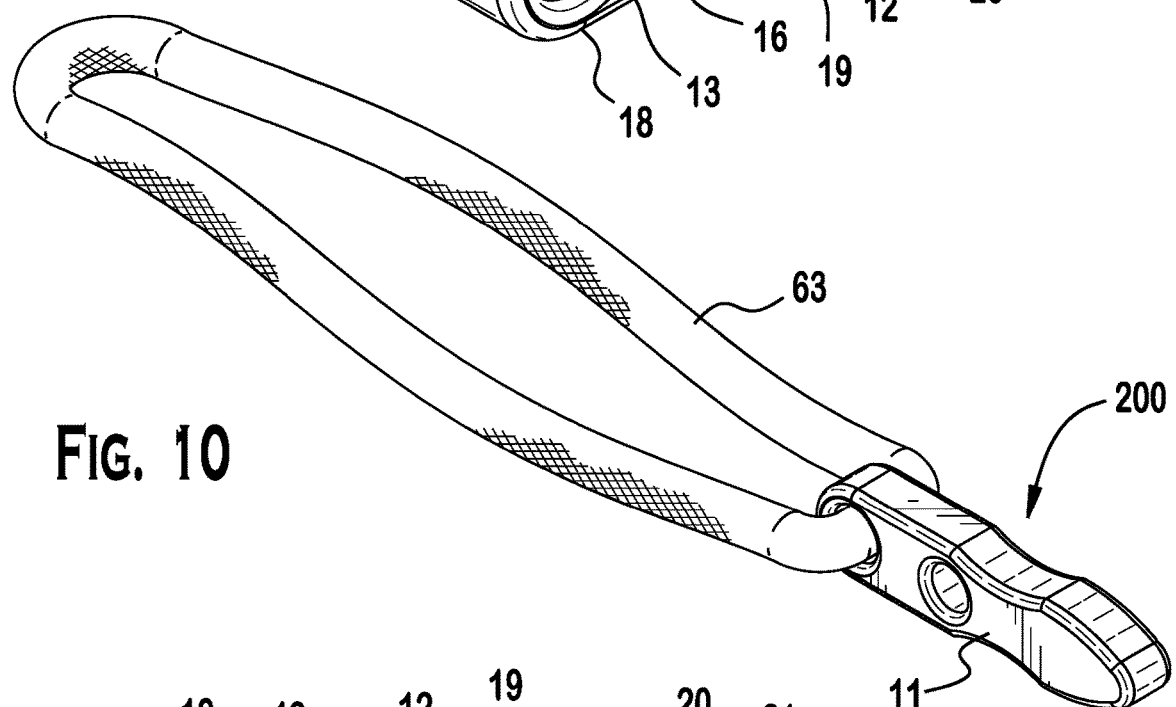
FIG. 10 is a perspective view of the tensioning tool of FIG. 9; showing cordage extending through the tensioning tool.
Figure 11:
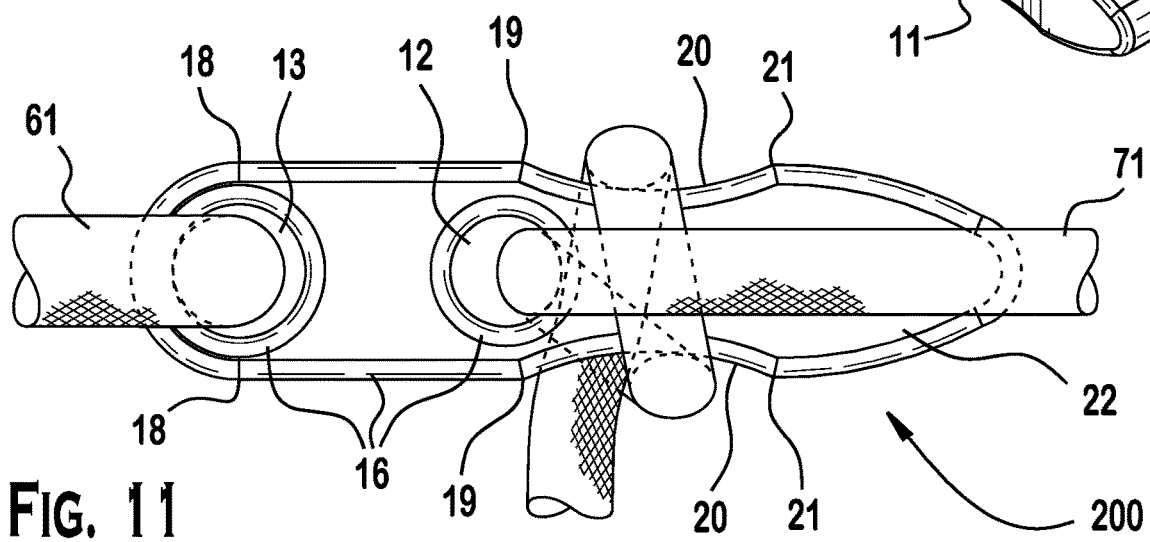
FIG. 11 is a left side elevation view of the tensioning tool of FIG. 9, showing additional cordage in a locked configuration with the tensioning tool.
Figure 12:
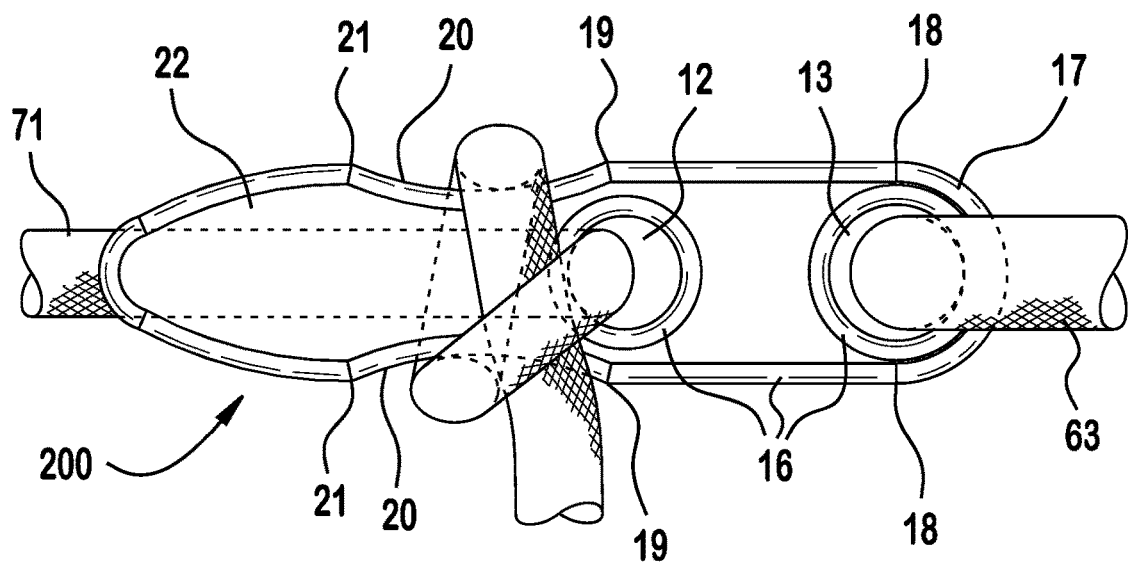
FIG. 12 is a right side elevation view of the tensioning tool of FIG. 11.
Figure 13:
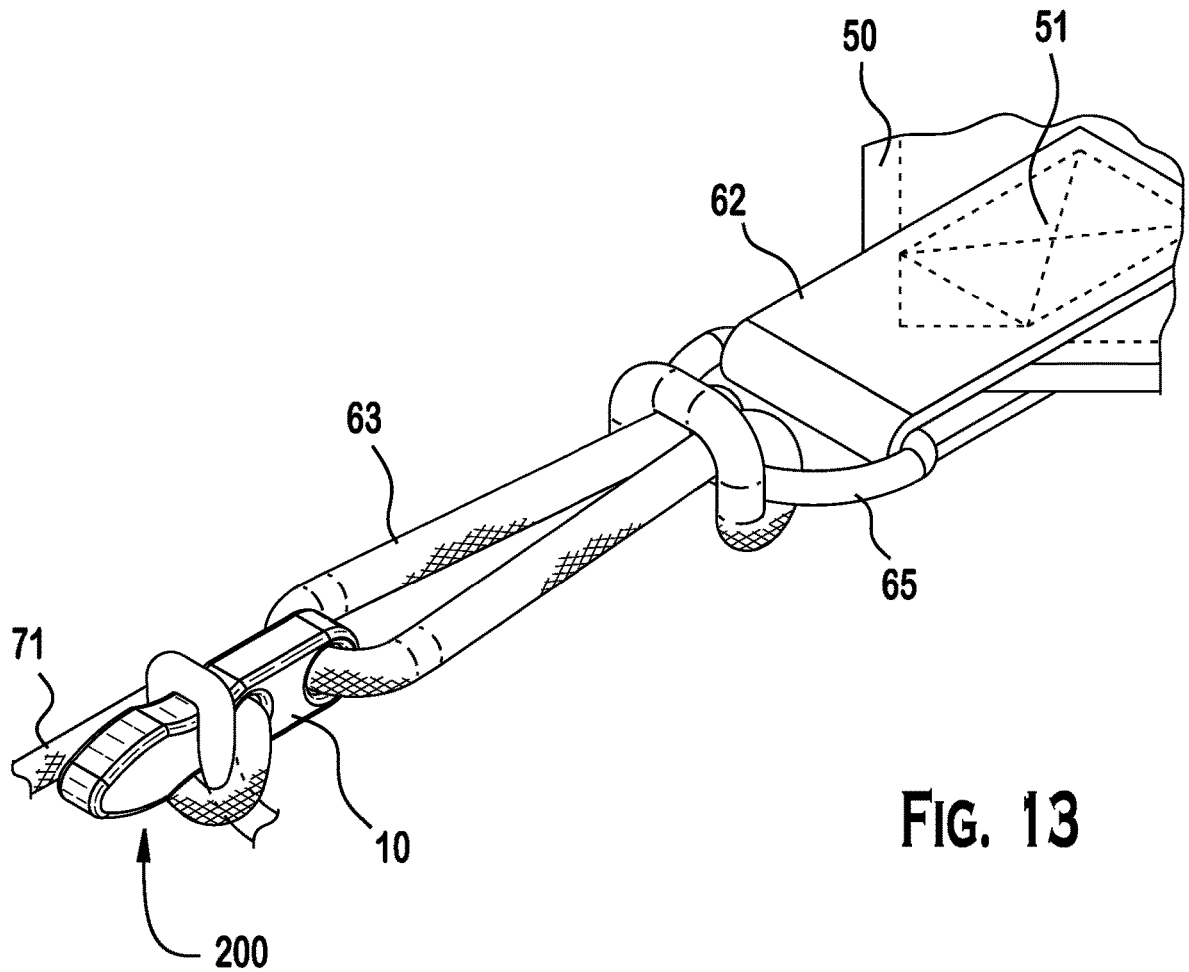
FIG. 13 is another perspective view of the tensioning tool of FIG. 9.
Figure 14:
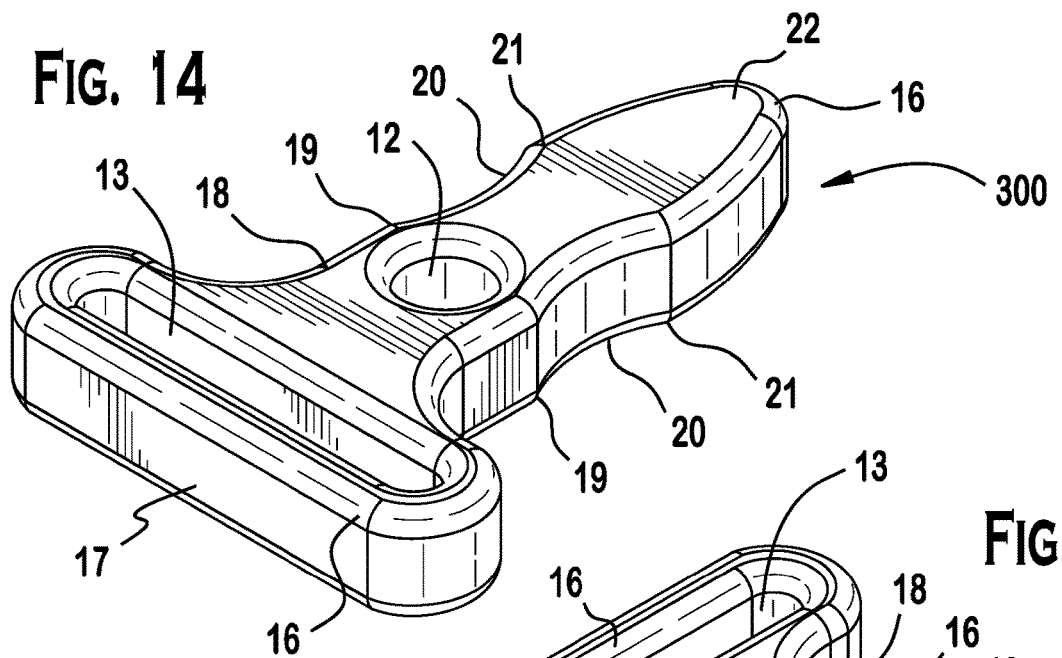
FIG. 14 is a perspective view of another tensioning tool according to the invention.
Figure 15:
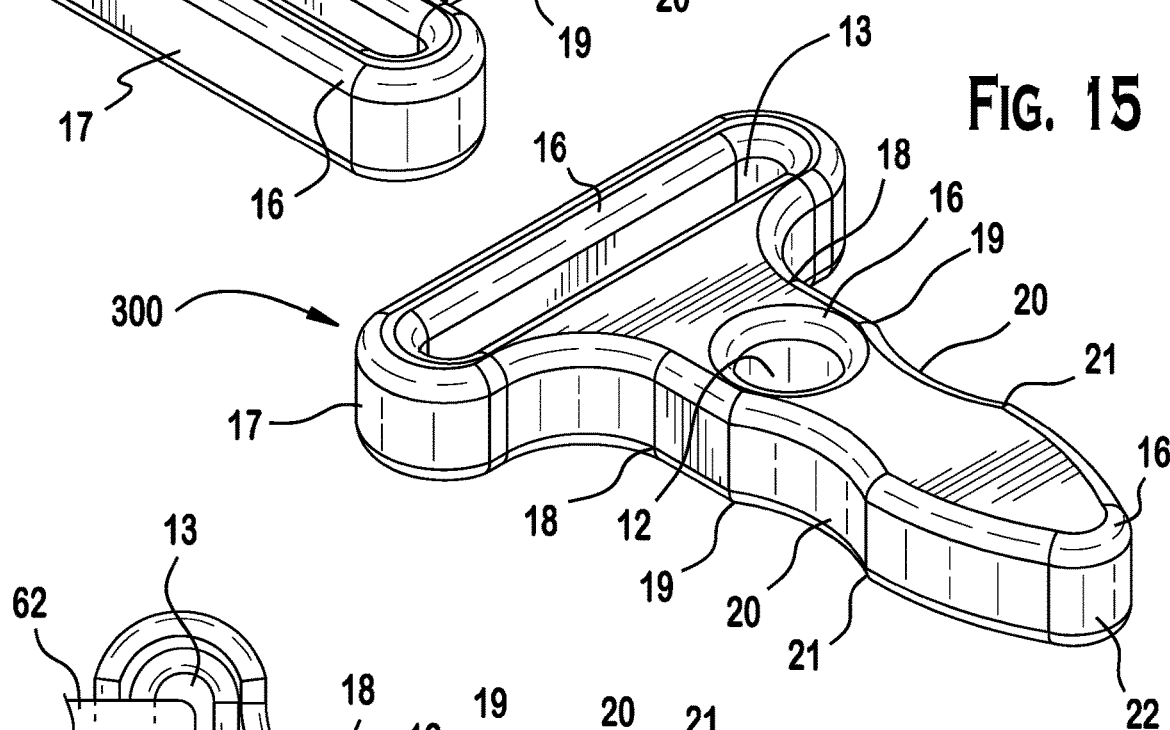
FIG. 15 is another perspective view of the tensioning tool of FIG. 14.

As shown, the body 11, the proximal passageway 13 is closed to form a cylindrical passageway in body 11. In the embodiment shown in FIGS. 9 through 13, tie material 60 is fed through the proximal passageway 13 in the body 11 of the tensioning tool 200. FIGS. 10 through 13 shows such a tie material 60 inserted in the proximal passageway 13. In FIGS. 10 and 13, the tie material 60 is continuous (i.e., without free ends) and preferably is a "shock cord" 63, made of an elastic material. In FIGS. 11 and 12 the support line 61 may be continuous (i.e., a "shock cord" 63) or non-continuous (i.e., ends that were not pre-joined).

FIGS. 11 through 13 show a second end of anchor line 71 inserted through the distal passageway 12 and looped about the body 11 to set and maintain the weight of an item to be secured. Preferably, the anchor line 71 is looped in such a way wherein the weight of the item to be secured traps and holds a portion of the anchor line 71 at a desired tension until deliberately released. FIGS. 11 and 12 show the left and right sides of the body 11 with the anchor line 71 and shock cord 63 in position. FIG. 13 shows the body 11 with the anchor line 71 threaded through the distal passageway 12 and a continuous shock cord 63 threaded through the proximal passageway 13, the opposite end of the shock cord 63 secured to a D-ring 65 at the end of a tarp securing point 51 on a tarp 50.

The looped and knotted configurations described above are applicable with this embodiment; the option of "quick release" from the tension on the anchor line is available with the non-knotted looped configuration.

As shown in FIGS. 14 through 18, another tensioning tool 300 according to the invention is shown. For the sake of brevity, only those features that differ from the tensioning tools 100 and 200 will be described, while like components will be omitted.

Figure 16:
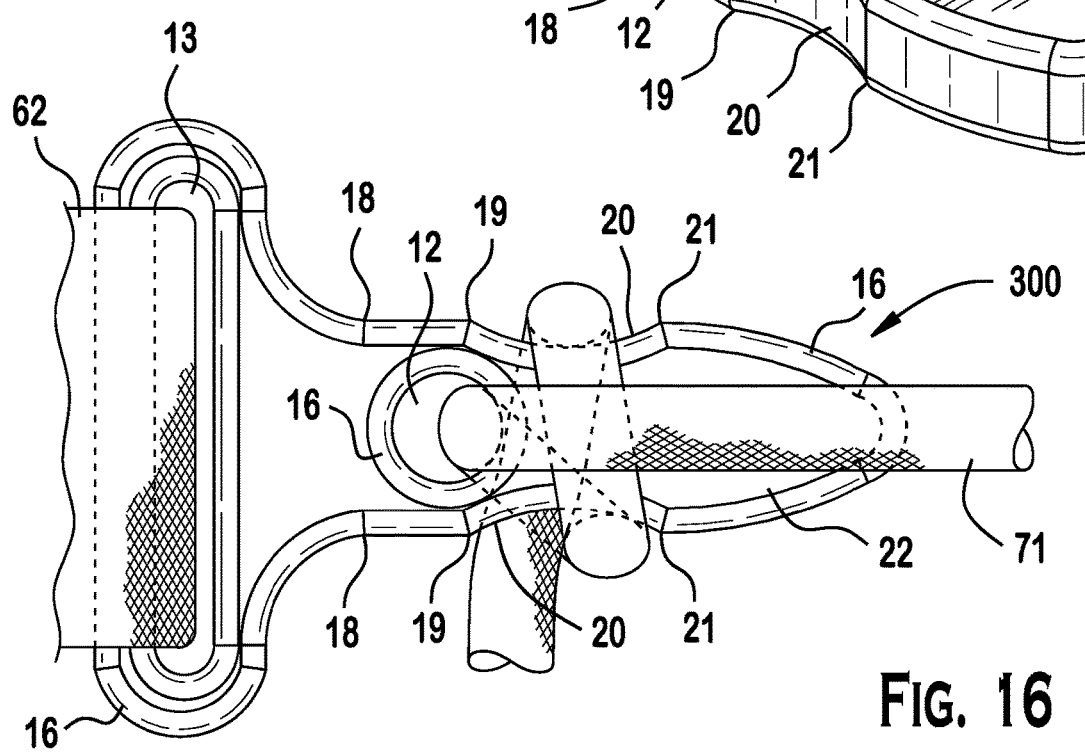
FIG. 16 is a bottom view of the tensioning tool of FIG. 14, showing a locked configuration of the tensioning tool with a webbing and cordage.
Figure 17:
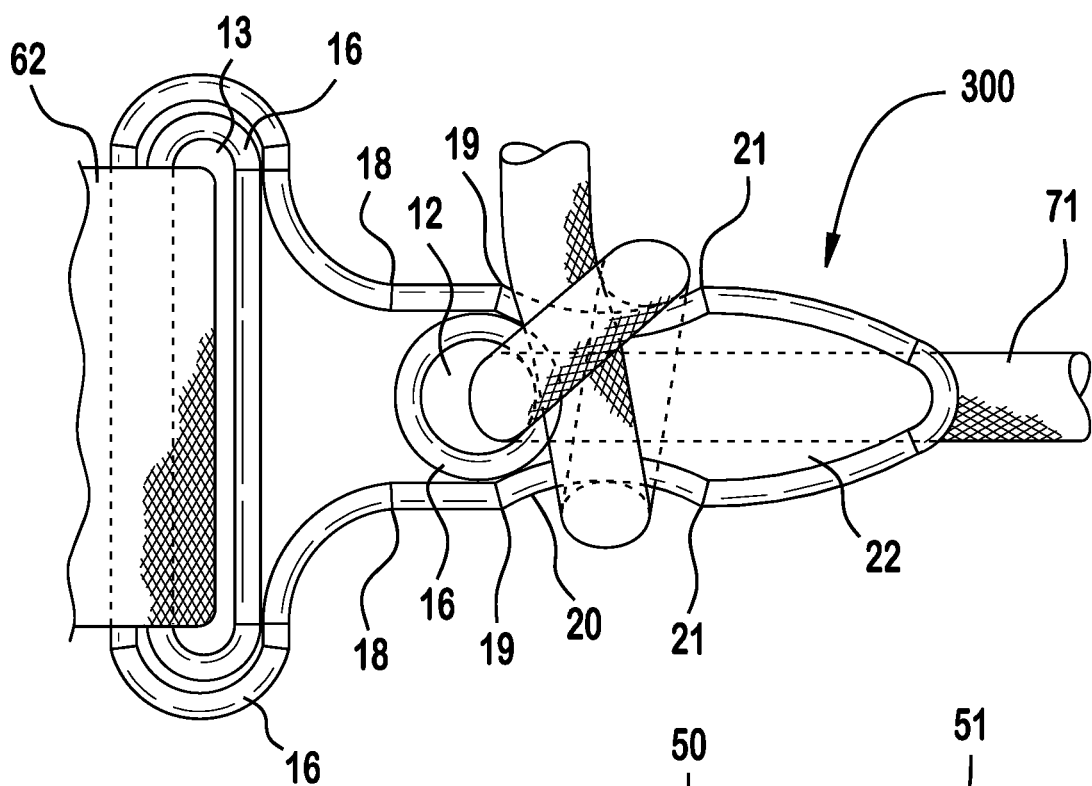
FIG. 17 is a top view of the tensioning tool of FIG. 16.
Figure 18:
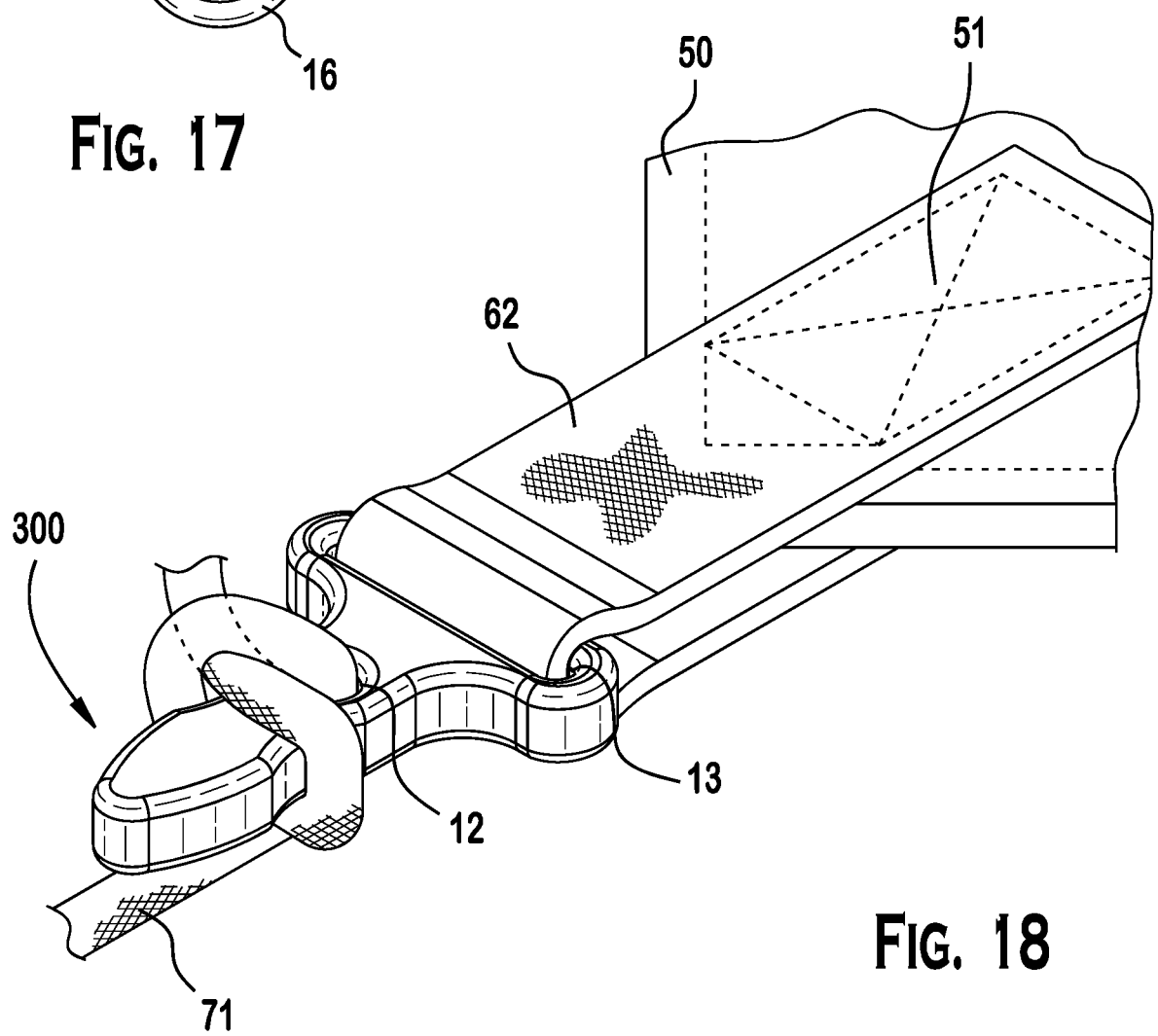
FIG. 18 is perspective view of the tensioning tool of FIG. 16.

As shown in FIGS. 14 through 18, the head 17 is elongated perpendicular to the longitudinal axis of the body 11 to create a proximal passageway 13 that extends through the body from lateral sides thereof and that is shaped and sized to accommodate a tie material 60 that is a strap 62 (i.e., a strap receiving passageway). FIGS. 16 and 17 show the top and bottom views of the body 11 with the distal passageway 12 threaded with a looped anchor line 71 and the elongated head 17 having a strap receiving proximal passageway 13 fitted with a strap 62. FIG. 18 shows the body 11 with a looped anchor line 71 threaded through the distal passageway 12 and a strap 62 fitted through the proximal passageway 13. In the shown embodiment, the strap 62 is attached at a tarp securing point 51 on a tarp 50.

The looped and knotted configurations described above are applicable with this embodiment; the option of "quick release" from the tension on the anchor line is available with the non-knotted looped configuration.

The tensioning tool (embodiments 100, 200, or 300 and referred to generally with the numeral 100) according to the invention may be an element in a kit which also includes tie materials 60 (anchor lines 71, support lines 61, shock cords 63, straps 62) with which to secure a tarp 50 or other load.

The tensioning tool 100 according to the invention may be used in a tarp anchoring system in which a tarp 50 is anchored to anchors 70, such as a ground anchor. The tensioning tool is secured directly or indirectly at its proximal end to support lines 61 or D-rings 65 attached to the tarp 50. The tensioning tool is secured at its distal end with an anchor line 71, a first end of which is secured to an anchor 70 and a second end of which is threaded through the distal passageway 12 in the body 11 of the tensioning tool 100 and then secured or knotted about the tensioning tool. The weight of the tarp 50 or other load is used to maintain the tension of the anchor line 71 after it has been pulled into the desired position by exerting force on the anchor line.

The foregoing illustrates some of the possibilities for practicing the invention. While certain embodiments of the invention have been described above, these descriptions are given for purposes of illustration and explanation. Variations, changes, modifications, and many other embodiments of the systems and methods disclosed may be adopted without departure from the scope and spirit of the invention. It is, therefore, intended that the foregoing description be regarded as illustrative rather than limiting, and that the scope of the invention is given by the appended claims together with their full range of equivalents.

What is claimed is:

1. A tensioning tool comprising:
    a body having:
        a proximal portion;
        a distal portion positioned opposite the proximal portion and having a waist defined by a pair of shoulder projections and a pair of hip projections positioned on opposite sides of the waist;
        a head disposed along a proximal end thereof;
        a pair of necks positioned along the proximal portion between the head and the pair of shoulders; and
        a tail positioned along a distal end of the distal portion and opposite the head;
    a proximal passageway extending through the body from lateral sides thereof and positioned linearly with the proximal portion;
    a distal passageway for receiving an anchor line and extending through the body from the lateral sides and positioned between the waist and the proximal passageway and positioned between the pair of shoulder projections and the pair of hip projections, the body having no more than one distal passageway;
    wherein the waist is positioned between the distal passageway and the tail.

2. The tensioning tool according to claim 1, wherein the proximal passageway has a diameter larger than a diameter of the distal passageway.

3. The tensioning tool according to claim 1, wherein the proximal passageway is a slot shaped opening running transverse to a linear length of the body.

4. The tensioning tool according to claim 3, wherein the proximal passageway has a width larger than a diameter of the distal passageway.

5. The tensioning tool according to claim 4, wherein the proximal passageway has the width larger than a width of the pair of hip projections.

6. The tensioning tool according to claim 5, wherein the proximal passageway has the width larger than a width of the pair of shoulder projections.

7. The tensioning tool according to claim 1, wherein the waist is hour glass shaped.

8. The tensioning tool according to claim 1, wherein the proximal passageway is positioned within the head.

9. The tensioning tool according to claim 1, wherein the hook further has the hook end outwardly projecting from a longitudinal axis of the body.

10. The tensioning tool according to claim 9, wherein the pair of necks are disposed on both a top and a bottom surfaces of the body.

11. The tensioning tool according to claim 1, wherein the pair of shoulders outwardly project from a longitudinal axis of the body.

12. The tensioning tool according to claim 11, wherein the pair of shoulders are positioned symmetrically on both a top and a bottom surfaces of the body.

13. The tensioning tool according to claim 1, wherein the pair of hips outwardly project from a longitudinal axis of the body.

14. The tensioning tool according to claim 13, wherein the pair of hips are positioned symmetrically on both a top and a bottom surfaces of the body.

* * * * *